July 20, 1954  G. E. COATS  2,684,112
FLEXIBLE TIRE COMPRESSING DEVICE
Filed April 21, 1952  2 Sheets-Sheet 2
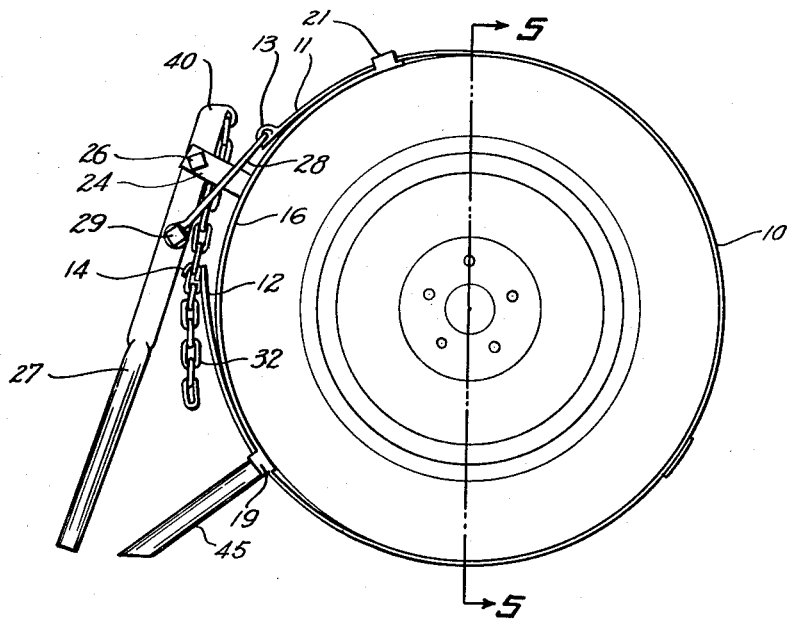
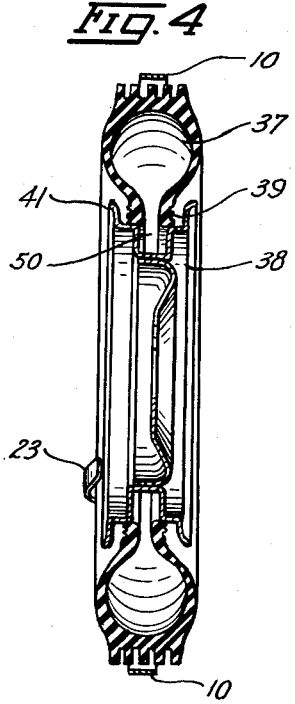
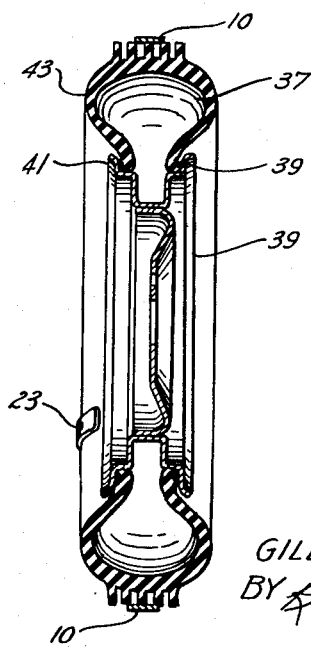
INVENTOR.
GILBERT E. COATS
BY
ATTORNEY.

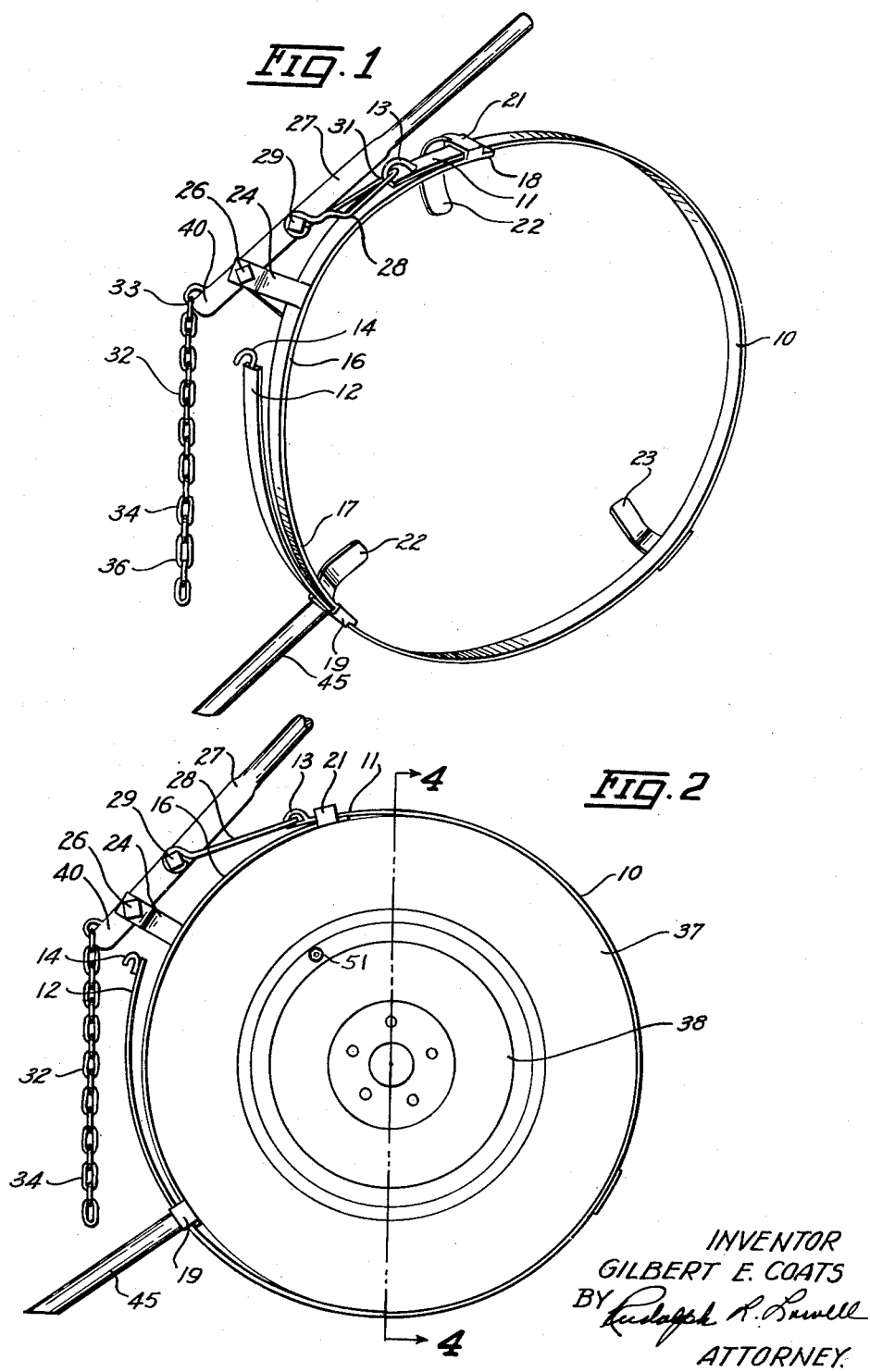

Patented July 20, 1954

2,684,112

UNITED STATES PATENT OFFICE 2,684,112

FLEXIBLE TIRE COMPRESSING DEVICE

Gilbert E. Coats, Fort Dodge, Iowa

Application April 21, 1952, Serial No. 283,402

1 Claim. (Cl. 157—1.1)

1

This invention relates generally to clamping devices and in particular to a device for clamping or squeezing the casing for a tubeless tire about a vehicle wheel or rim to move the casing bead within and against the rim.

Tires now coming into more general use are of the type known as tubeless tires, in which the usual inner tube is eliminated, and the bead of the tire casing maintained in an air sealed engagement with the wheel rim. Especially in the assembly of new tires of this type on a vehicle rim appreciable inconvenience and difficulty is encountered in initially locating the casing bead within the vehicle rim.

It is an object of this invention, therefore, to provide an improved tire squeezing clamp for moving the bead of a deflated casing within a vehicle rim.

A further object of this invention is to provide a tire squeezing clamp for locating the bead of a tubeless tire within a vehicle rim which is efficient and safe in operation, economical in cost and capable of being easily handled and manipulated by one man.

Further objects, features and advantages of this invention will become apparent from the following description when taken in connection with the accompanying drawing in which:

Fig. 1 is a perspective view of the tire squeezing device of this invention;

Fig. 2 is a side elevational view of the tire squeezing device shown in initial assembly about a tire;

Fig. 3 is illustrated similarly to Fig. 2 and shows the squeezing device assembled in an applied position on the tire; and Figs. 4 and 5 are sectional views taken along the lines 4—4 and 5—5, in Figs. 2 and 3, respectively.

With reference to the drawings, the tire clamping or squeezing device of this invention is illustrated in Fig. 1, as including a split ring or open band member 10, of a flat shape, formed of a resilient or spring material and having its terminal ends 11 and 12 normally spaced apart. A closed hook 13 and an open hook 14 are carried at the terminal ends 11 and 12, respectively, so as to project outwardly from the ring 10.

Extended across the space between the terminal ends 11 and 12 to peripherally close the ring 10, is a flat ring segment 16, which has the end sections 17 and 18 thereof underlying, or overlapping the terminal ends 11 and 12 of the ring 10, so that the segment 16 lies entirely within the peripheral confines of the ring 10.

2

The ring segment 16 is movably supported on the ring 10 for relative peripheral movement by the provision of looped guide members 19 and 21 extended radially outwardly from the ends of the segment sections 17 and 18, respectively, and within which the terminal ends of the ring 10 are slidably received.

In the assembly of the ring 10 and the ring segment 16, the terminal ends 11 and 12 of the ring 10 are initially inserted through the looped guide members 19 and 21, after which the hooks 13 and 14 are secured, as by welding, onto the ring 10. The hooks 13 and 14 thus constitute a stop means for locking the ring segment 16 in assembled relation with the ring 10. Each loop 19 and 21 is integrally formed with a tire retaining finger 22, which extends radially inwardly to one side of the ring 10. A third tire retaining finger 23 is secured directly to the ring 10 at a position opposite the ring segment 16.

Extended radially outwardly from the ring segment 16, at a position between the terminal ends 11 and 12 of the ring 10 is a support member 24 which carries a pivot pin 26 in its outer end. Pivoted on the pin 26 for pivotal movement in the plane of the ring 10 is a lever 27. A substantially rigid link 28, of a U-shape has the legs thereof pivoted at 29 with the lever 27, to one side of the lever pivot 26, and the base section 31 thereof looped about the hook 13.

A flexible link 32, illustrated as a chain length has one end movably connected at 33 to the end 40 of the lever 27, and on the opposite side of the pivot 26 relative to the connection 29 of the link 28 with the lever 27. The other end 34 of the chain 32 is connected with the hook 14 by merely inserting the hook 14 through one of the chain links 36.

Especially for new tubeless tires, the casing 37 has the beads 39 thereof adjacent to each other, as shown in Fig. 4, so that when the tire is positioned about the wheel 38, the beads are opposite the well or groove 50 in the rim 41. As a result admission of air into the well through a suitable air valve 51, is incapable of forcing the casing beads 39 against the rim walls 41.

In the use of the tire squeezing device of this invention when the tire casing 37 (Figs. 2 and 4) is mounted about a vehicle wheel 38, the ring 10 and ring segment 16 are positioned about the casing 37 so that one side of the tire and wheel assembly is against the retaining fingers 22 and 23. The squeezing device, with the tire and wheel assembly therein, is manually supported in an upright position, and is maintained against rotational movement along a floor surface by the provision of a stop arm or leg 45 extended radially upwardly from the loop guide member 19.

With the lever 27 in its position shown in Figs. 1 and 2, in which the lever end 40 is substantially opposite the hook 14, a desired chain link 36 is slipped over the hook 14. With the chain thus connected, the lever 27 is moved in a counter clockwise direction as viewed in Fig. 2, to its position shown in Fig. 3, corresponding substantially to a one hundred and eighty degree movement of the lever 27, so that the lever end 40 is located opposite the closed hook 13. As a result of this pivotal movement of the lever 27, the terminal ends 11 and 12 of the ring 10 are pulled inwardly toward each other, to in turn provide for the squeezing of the tire 37 about the vehicle wheel 38.

As shown in Fig. 4, when the squeezing or clamping device is initially positioned about the tire 37, the tire beads 39 are adjacent each other and opposite the well 50. However, on manipulation of the lever 27, after the chain 32 has been connected to the hook 14, the tire 37 is pressed or squeezed about the vehicle wheel, resulting from the circumferential reduction of the ring 10, and with this squeezing action providing for the bulging outwardly of the tire side walls 43, and the movement of the tire beads 39 away from each other to positions within and against the rim side walls 41.

Air admitted into the well 50 thus enters the tire casing 37, and acts upon the casing side walls to force and hold the beads 39 against the rim walls 41. The wheel and tire assembly is then released from the clamping device and the tire casing inflated to a desired pressure for use.

Although the invention has been described with respect to a preferred embodiment thereof, it is to be understood that it is not to be so limited since changes and modifications can be made therein which are within the full intended scope of this invention as defined by the appended claims.

I claim:

A clamping device for squeezing a tire casing about a vehicle wheel in the mounting of the casing on the wheel comprising, a split ring member the terminal ends of which are normally spaced apart, a ring segment located within the confines of said split ring and extended across the space between said terminal ends, means movably supporting said ring segment on said split ring for relative peripheral movement, a radially outwardly extended support on said ring segment between said terminal ends, a lever pivoted intermediate the ends thereof on said support for pivoted movement in the plane of said ring member, a first link connected to one of said terminal ends and to said lever, and a second link connected to the other of said terminal ends and to said lever, with the connection of said two links with said lever being at opposite sides of the pivot for said lever, and with one of said links being constructed such that the effective length thereof is adjustable to provide for the use of the device with tires of different diameters.

References Cited in the file of this patent

UNITED STATES PATENTS

| Number | Name | Date |
|---|---|---|
| 473,764 | Little | Apr. 26, 1892 |
| 750,795 | Bates | Feb. 2, 1904 |
| 1,648,661 | Senn | Nov. 8, 1927 |
| 1,966,580 | Bull | July 17, 1934 |
| 2,302,475 | Richards | Nov. 17, 1942 |